(12) United States Patent
Sinofsky

(10) Patent No.: US 7,281,834 B2
(45) Date of Patent: Oct. 16, 2007

(54) METHOD AND APPARATUS FOR IMAGE ILLUMINATION USING SELF-CONTAINED LUMINAIRE

(75) Inventor: Edward L. Sinofsky, Dennis, MA (US)

(73) Assignee: PhotoGlow, Inc., Dennis, MA (US)

( * ) Notice: Subject to any disclaimer, the term of this patent is extended or adjusted under 35 U.S.C. 154(b) by 224 days.

(21) Appl. No.: 10/766,419

(22) Filed: Jan. 28, 2004

(65) Prior Publication Data

US 2005/0162867 A1 Jul. 28, 2005

(51) Int. Cl.
*F21V 7/04* (2006.01)
(52) U.S. Cl. .................. 362/608; 362/609; 362/610; 362/294; 362/614; 362/634; 362/255
(58) Field of Classification Search ................. 349/65; 362/608–610, 623–626, 632–634, 294, 373, 362/603, 602, 614, 629, 310, 327–329, 255–256, 362/604
See application file for complete search history.

(56) References Cited

U.S. PATENT DOCUMENTS

| | | | | |
|---|---|---|---|---|
| 3,673,401 | A * | 6/1972 | Du Pont ..................... | 362/377 |
| 4,048,537 | A * | 9/1977 | Blaisdell et al. ............ | 313/489 |
| 4,318,163 | A * | 3/1982 | Bryan ........................ | 362/359 |
| 4,924,368 | A * | 5/1990 | Northrop et al. ........... | 362/376 |
| 5,036,436 | A * | 7/1991 | Rattigan et al. ............. | 362/33 |
| 5,408,387 | A * | 4/1995 | Murase et al. .............. | 362/623 |
| 5,838,406 | A | 11/1998 | McGregor et al. | |
| 5,926,033 | A * | 7/1999 | Saigo et al. ................ | 362/600 |
| 6,186,649 | B1 * | 2/2001 | Zou et al. ................... | 362/347 |
| 6,210,013 | B1 | 4/2001 | Bousfield | |
| 6,236,799 | B1 | 5/2001 | Huh et al. | |
| 6,281,625 | B1 * | 8/2001 | Tachibana et al. .......... | 313/489 |
| 6,452,325 | B1 * | 9/2002 | Dupont ....................... | 313/489 |
| 6,576,887 | B2 | 6/2003 | Epstein et al. | |
| 6,741,301 | B2 * | 5/2004 | Tsuji ........................... | 349/58 |
| 6,935,766 | B2 * | 8/2005 | Ato ............................. | 362/633 |
| 6,979,112 | B2 * | 12/2005 | Yu et al. ..................... | 362/600 |
| 2003/0034445 | A1 | 2/2003 | Boyd et al. | |

(Continued)

FOREIGN PATENT DOCUMENTS

CA 2229931 3/1997
WO WO 02/061334 A1 8/2002

(Continued)

OTHER PUBLICATIONS

Plexiglas EliT Acrylic Sheet, Technical Recommendations.

(Continued)

*Primary Examiner*—Thomas M. Sember
(74) *Attorney, Agent, or Firm*—Hamilton, Brook, Smith & Reynolds, P.C.

(57) ABSTRACT

A planar waveguide system includes a planar waveguide having a planar surface for emitting light, a back panel opposite the planar surface, and edge sides between the planar surface and the back panel. To reduce light energy losses during delivery of light from the light source to the planar surface, the system uses a transparent dielectric sleeve for holding a light source that is positioned adjacent to an edge side of the planar waveguide to enable light from the light source through the sleeve and incident into the planar waveguide.

45 Claims, 6 Drawing Sheets

U.S. PATENT DOCUMENTS

2003/0046842 A1  3/2003  Maas et al.
2003/0051380 A1  3/2003  Butler et al.
2003/0067760 A1  4/2003  Jagt et al.
2003/0086030 A1  5/2003  Taniguchi et al.
2003/0147256 A1  8/2003  Kraft
2003/0147259 A1  8/2003  Kraft

OTHER PUBLICATIONS

Kimoto Tech, Inc., KB Film for Electronic Displays and panels, http://www.kimototech.com/industrial.htm, Dec. 23, 2003.

Vikuiti Enhanced Specular Reflector (ESR), 3M Electronic Display Lighting.

* cited by examiner

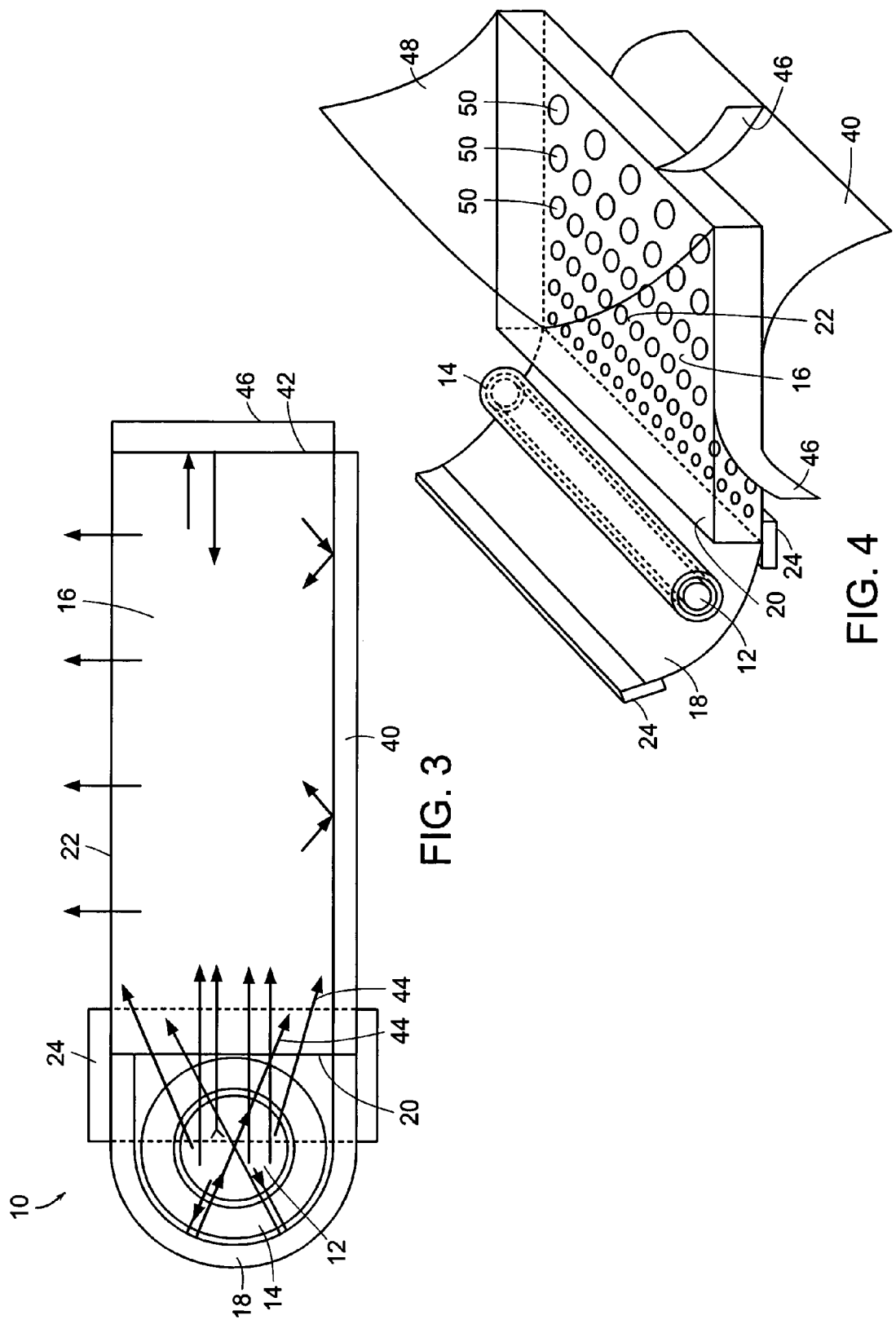

METHOD AND APPARATUS FOR IMAGE ILLUMINATION USING SELF-CONTAINED LUMINAIRE

BACKGROUND OF THE INVENTION

Signs, pictures, displays, and paintings are often illuminated to enhance the display of graphical or visual information to observers, especially in low light conditions. The image may be front lit where the light source is located in front of the image displayed or back lit where the light source is located behind the image that is embedded upon or within media capable of allowing pass-through light emissions. For example, large billboard advertisements often use light boxes with florescent bulbs positioned behind the billboard to illuminate the billboard's image. Some billboards, however, continue to use front lighting where lamps are positioned above or below the billboard and directed toward the billboard's face.

Recently, the evolution of electronic devices such as computers, laptops, cellular telephones, televisions, and the like have stimulated the need and demand for electronic graphical displays such as color liquid crystal displays (LCD). To enhance the observed image, these devices have displays that are typically back lit from a light source. These devices may use waveguides to distribute light uniformly throughout the plane of an image display. Certain devices may also use an edge-lit waveguide wherein a light source is placed in proximity to the edge of a waveguide plate or panel to illuminate the image on the device's display.

Other systems provide back lit illumination for pictures using edge lit waveguides in custom-molded frames.

SUMMARY OF THE INVENTION

The present invention provides certain improvements and advantages over the prior art. In one aspect, the present invention provides a method, apparatus, and system of illuminating an image using a self-contained luminaire.

In one embodiment, a flat panel luminaire apparatus includes a light source, a transparent insulating sleeve surrounding the light source, and a planar waveguide having an edge in contact with the insulating or dielectric sleeve. The waveguide receives light from the sleeve and then emits the received light through its planar surface. The planar waveguide, insulating sleeve, and light source may form a self-contained unit that may be capable of removable insertion into a display structure such as a standard picture frame. Such a unitary and removably insertable form of the present invention provides advantages in handling, maintenance, replacement, and choice of available frame types.

A reflector may surround a substantial portion of the insulating sleeve and light source to direct light from the light source into an edge of the planar waveguide. The apparatus may use an adhesive or friction connector to couple the reflector to the planar waveguide. The adhesive connector may be metalized, vinyl, or transparent polyester tape. The friction connector may be a metal or plastic, U-shaped or J-shaped, clip or clamp, or the like. To reduce possible electrical current flow within the adhesive or friction connector, the connector may be segmented into two or more sections along the edge of the planar waveguide.

In one embodiment, a thin polymer film reflector and adhesive tape hold the insulating sleeve in contact with the edge of the planar waveguide to facilitate delivery of light to the planar waveguide. The reflector may also be a metal sheet, white polymer sheet, a white Polyethylene Terephthalate (PET) sheet, a polytetrafluoroethylene (PTFE) sheet, or a thin polymer film specular surface reflector sheet.

The apparatus may also use a back panel for the planar waveguide to reflect light toward the light emitting planar surface of the planar waveguide while limiting pass-through light emissions. The material used for the back panel may be a polystyrene, a foamed Poly-Vinyl Chloride (PVC), a Polyethylene Terephthalate (PET) sheet, or a thin polymer film specular reflector sheet.

The transparent insulating sleeve may be, for example, a clear fluoropolymer tube. Also, the insulating sleeve typically has an index of refraction similar to the index of refraction of the planar waveguide to enable increased amounts of light transfer from the insulating sleeve to the planar waveguide. Preferably, the index of refraction is equal to or somewhat lower than the index of refraction of the planar waveguide. The planar waveguide is typically either an acrylic plate or scattered Plexiglas (acrylic glass) plate. Scattered Plexiglas plate is preferably used to enable an even distribution of light to be emitted from the planar surface of the planar waveguide. To ensure an even distribution of emitted light if acrylic plate is used, the planar waveguide may include a matrix of dots whose diameters or densities of white ink increase as a function of distance from the light receiving edge of the planar waveguide.

The planar waveguide may also use varying amounts of internal discrete light scattering elements to disperse light from the edge light source to evenly emit light from the planar surface of the planar waveguide. Such scattering elements may include prisms, defects, gaps, channels, notches, suspended materials, and the like.

In certain embodiments, the insulating sleeve removably holds the light source which may be a cold cathode florescent lamp. The light source may also be derived from a chemiluminescent reaction. To cause the angle of the received light to be about the critical angle, the edge of the planar waveguide may be formed with grooves.

In another embodiment, a method of providing planar lighting includes the steps of holding a light source in a transparent dielectric sleeve and emitting light from a light source substantially uniformly through the planar surface of a planar waveguide by contacting at least one edge of the planar waveguide with the sleeve such that the planar waveguide receives light form the light source through the sleeve.

In yet another embodiment, a planar waveguide system includes a planar waveguide having a planar surface for emitting light, a back panel opposite the planar surface, and edge sides between the planar surface and the back panel. To reduce light energy loss during delivery of light from the light source to the planar surface, the system uses a transparent dielectric sleeve for holding the light source. The sleeve is positioned adjacent to an edge side of the planar waveguide to enable light from the light source through the sleeve to be incident into the planar waveguide.

The sleeve effectively enables contact between the light source and the planar waveguide, allowing the planar waveguide to respond to received light by emitting increased amounts of light with respect to a non-contact light source. Also, a means for holding the sleeve positioned adjacent to the edge side of the planar waveguide is employed.

The sleeve may be a clear fluoropolymer tube with an index of refraction similar to or slightly less than the index of refraction of the planar waveguide which increases the amount of light received by the planar waveguide. Furthermore the light source may be a cold cathode fluorescent lamp or a chemiluminescent light stick. Preferably, the light source is held by the sleeve in a removably insertable manner.

In a further embodiment, an image display apparatus includes media embedded with an image, a display structure for displaying the image, and a self-contained luminaire capable of removable insertion into the display structure. Also, the self-contained luminaire may function as a backing board for the display structure. Furthermore, the self-contained luminaire may utilize a means for limiting the amount of light escaping from the back of the display structure to about 1% or less of the amount of light within the planar waveguide of the luminaire. Preferably, the display structure includes a slot into which the self-contained luminaire may be positioned behind the media embedded with the image. The slot may also enable a transparent panel to be positioned in front of the image.

In another embodiment, an image illumination system includes media capable of being embedded with an image, a self-contained luminaire acting as a back light for the media, and a means for positioning the media in front of the self-contained luminaire. The image may be printed or embedded on or within the media by any one of an inkjet printer, laserjet printer, photoprocessor, and photograph printer. The orientation and mechanism for positioning the image in front of the luminaire may vary. For instance, the luminaire and its light emitting planar surface may be orientated substantially horizontally to allow gravity to hold an image in a position in front of (on top of) the luminaire.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 shows the light reflection by the reflector, back panel, and edge reflectors of an embodiment;

FIG. 4 is an exploded view of an embodiment using a planar waveguide having a matrix of dots of varying diameter;

DETAILED DESCRIPTION OF THE INVENTION

A description of preferred embodiments of the invention follows.

Figure 1A:
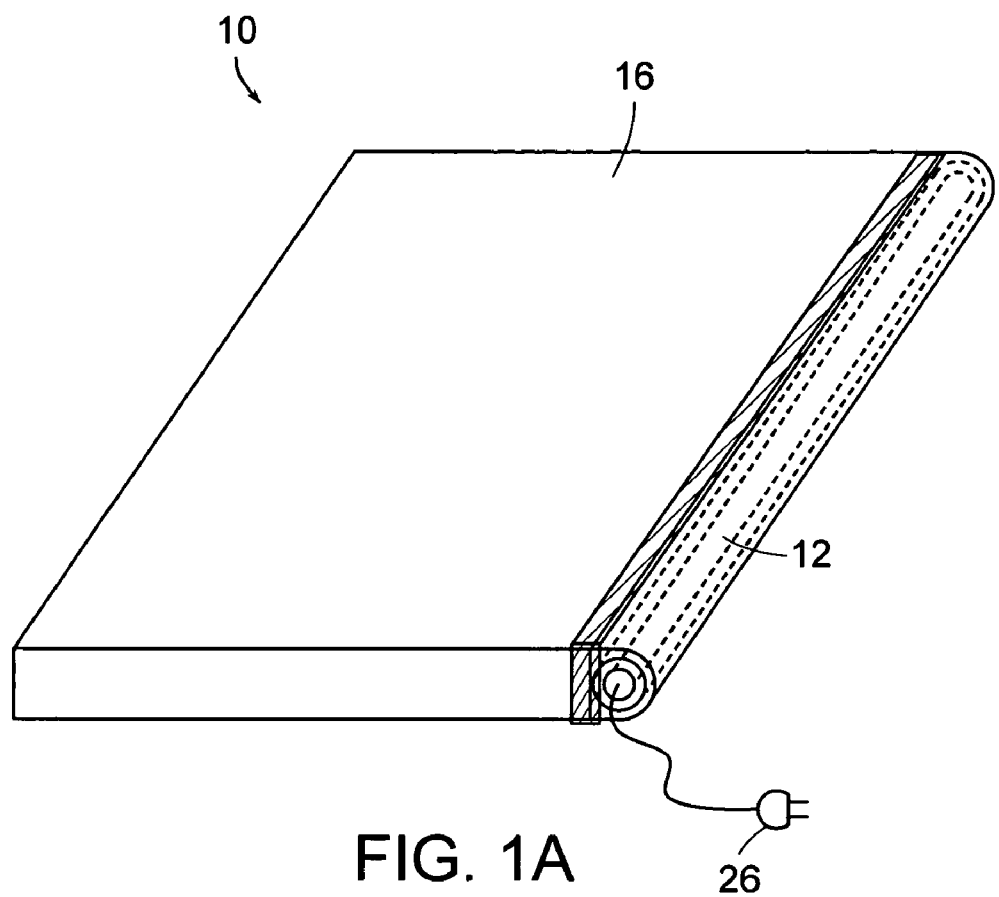
FIGS. 1A and 1B show a perspective and side view respectively of an embodiment of the present invention.
Figure 1B:
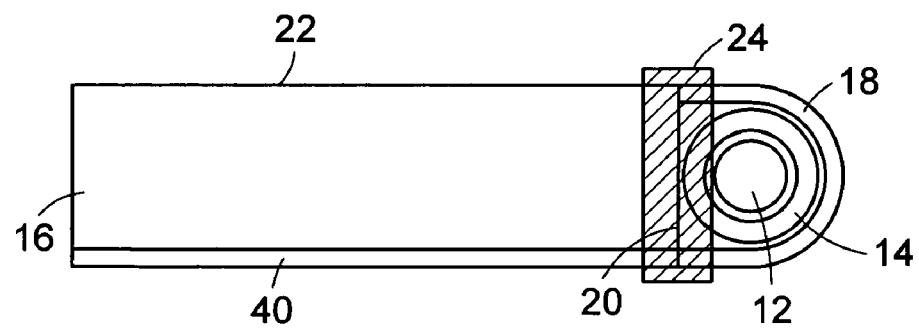
Figure 2:
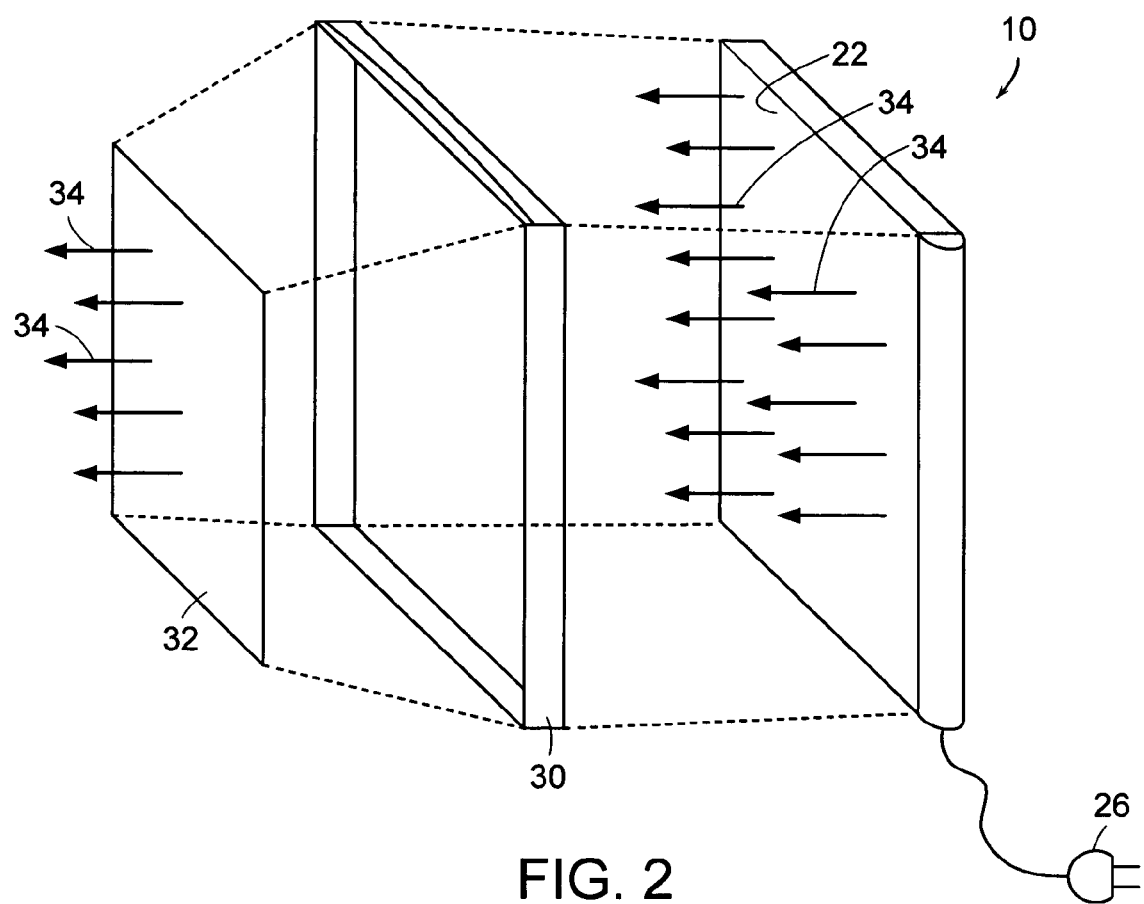
FIG. 2 is an exploded view of a self-contained luminaire embodiment, picture frame, and image.

In one embodiment as illustrated in FIGS. 1A and 1B, a flat panel luminaire 10 includes light source 12, transparent insulating sleeve 14 surrounding light source 12, and planar waveguide 16 having edge 20 in contact with the insulating or dielectric sleeve 14. The planar waveguide 16 receives light from sleeve 14 through edge 20 and then emits the received light through planar surface 22. The planar waveguide 16, insulating sleeve 14, and light source 12 may take the form of a self-contained unit that is capable of removable insertion into a display structure 30 of FIG. 2. As shown in FIG. 2, luminaire 10 acts as a back light for an image embedded on media 32 within display structure 30 by emitting light waves 34 from planar surface 22 through the back of media 32. Display structure 30 is typically a picture frame.

The use of insulating or dielectric sleeve 14 is a particularly novel aspect of the present invention. Prior art edge lit devices usually separate the light source from the waveguide and reflector because the heat generated by the light source can melt the reflector, depending on the material used, or the edge of the waveguide. Separation also prevents possible electrical current flow along the edge of the planar waveguide that can reduce the intensity of emitted light from the waveguide. Unfortunately, this separation also reduces the amount of light transfer or coupling from the light source to the waveguide.

By using transparent insulating sleeve 14, the thermal energy transfer from light source 12 to reflector 18 or planar waveguide 16 is significantly reduced, preventing thermal damage to reflector 18 and planar waveguide 16. Thus, light source 12, insulating sleeve 14, and planar waveguide 16 may be physically coupled and contacting each other to form a self-contained unit that can subsequently be inserted into any standard picture frame such as display structure 30. This feature is particularly advantageous compared with existing back lit systems that require custom-molded frames to house existing edge lit light sources some distance (spaced apart) from the waveguide.

Accordingly, transparent insulating sleeve 14, in the preferred embodiment, has a high dielectric constant. One example material is clear fluoropolymer (e.g., Teflon). As such, a clear fluoropolymer tube may serve as transparent insulating sleeve 14.

To provide another advantage and further efficiencies, insulating sleeve 14 preferably has an index of refraction (e.g. 1.38) slightly less than or equal to the index of refraction of planar waveguide 16 (e.g. 1.5). Unlike the index of refraction for air (e.g. 1.0) through which light must travel between the light source and waveguide in prior art systems, the intermediate (e.g. 1.38) or equal index of refraction of insulating sleeve 14 enables increased amounts of light transfer or coupling from light source 12 through insulating sleeve 14 to planar waveguide 16. Other relatively similar indices of refraction between insulating sleeve 14 and planar waveguide 16 are suitable. Because insulating sleeve 14 is a dielectric with the additional ability to prevent or reduce electrical current flow, insulating sleeve 14 may also improve the intensity of light emitted from planar surface 22 by reducing the current flow and the resulting electrical potential decrease across edge 20 of planar waveguide 16.

As shown in FIG. 1B, reflector 18 may surround a substantial portion of insulating sleeve 14 and light source 12 to direct light waves 44 from light source 12 into edge 20 of planar waveguide 16 as illustrated in FIG. 3. The luminaire 10 may use adhesive connector 24 or friction connector 28 (FIG. 5) to couple reflector 18 to planar waveguide 16. In the FIGS. 1A and 1B embodiment, adhesive connector 24 is used to connect reflector 18 to the bottom and top of edge 20. The adhesive connector 24 is preferably a strip of adhesive tape that wraps around edge 20, reflector 18, and the ends of sleeve 14 and light source 12. Alternatively, as shown in FIG. 4, adhesive connector 24 may couple reflector 18 to the top and bottom of edge 20 of waveguide 16 using respective top and bottom strips. The adhesive connector 24 may be metalized, vinyl, or polyester tape.

Figure 5:
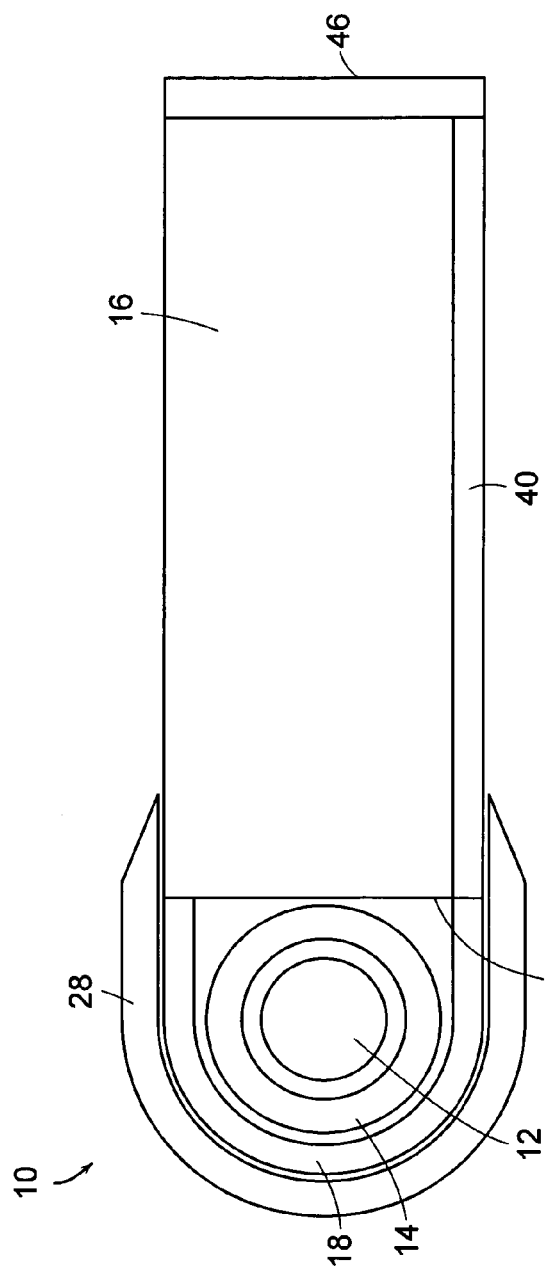
FIG. 5 is a side view of an embodiment using a friction connector.

Instead of adhesive connector 24, a friction connector 28, as shown in FIG. 5, may be used to couple reflector 18 to planar waveguide 16. In the FIG. 5 embodiment, friction connector 28 is preferably a plastic U-shaped clip with a diameter slightly larger than the effective diameter of reflector 18. The friction connector 28 may use tension on each end of a U-shaped clip to hold friction connector 28 to the top and bottom surfaces of planar waveguide 16 while also effectively holding the assembly of reflector 18, insulating sleeve 14, and light source 12 against planar waveguide 16. The friction connector 28 may extend along edge 20 with a length approximately the same as insulating sleeve 14. The friction connector 28 may be a metal or plastic, U-shaped or J-shaped, clip or clamp, or the like. To reduce possible electrical current flow along either adhesive connector 24 or friction connector 28, connector 24 or 28 may be segmented into two or more sections along edge 20 of planar waveguide 16.

In a certain embodiment, reflector 18 may be a thin polymer film and connector 24 may be an adhesive tape that holds insulating sleeve 14 in contact with edge 20 of planar waveguide 16 to facilitate delivery of light to planar waveguide 16. Enhanced Specular Reflector (ESR), developed by 3M Corporation, is a particular type of thin polymer film and specular surface reflector that may be used due to its greater than 98% reflectance property. The reflector 18 may also be made of metal, metalized tape, white polymer, white Polyethylene Terephthalate (PET), or polytetrafluoroethylene (PTFE). The reflector 18 is preferably in the form of a flexible thin film or sheet to enable reflector 18 to wrap around insulating or dielectric sleeve 14.

As shown in FIG. 3, luminaire 10 may also use back panel 40 of planar waveguide 16 to reflect light toward light emitting planar surface 22 of the planar waveguide 16 while preventing pass-through light emissions. The material used for the back panel 40 may be a polystyrene, a foamed Poly-Vinyl Chloride (PVC), a Polyethylene Terephthalate (PET), or a thin polymer film specular reflector sheet to preferably reduce pass through emissions to about 1% or less. Additional back panel sheets may be applied to the back of display structure 30 to further prevent light from exiting the back of display structure 30 of FIG. 2.

The planar waveguide 16 is typically either an acrylic plate or scattered Plexiglas (acrylic glass) plate. To ensure an even distribution of emitted light from planar surface 22 if acrylic plate is used, planar waveguide 16, as shown in FIG. 4, may include a matrix of dots 50 whose diameters or densities of white ink increase as a function of distance from the light receiving edge 20 of planar waveguide 16. The white ink within dots 50 forces the angle of received light waves to exceed the critical angle. Thus, the amount of scattering and emitted light may be increased by increasing the density of white ink within the dots 50, by increasing the diameter of dots 50, or by a combination of increasing both the diameter of and density of white ink within dots 50.

The planar waveguide 16 may act as both a waveguide and light scattering mechanism by using varying amounts of internal discrete light scattering elements to disperse light from light source 12 adjacent to edge 20 in order to evenly emit light from planar surface 22 of planar waveguide 16. Such scattering elements may include prisms, defects, gaps, channels, notches, suspended materials, and the like. Atoglas Plexiglas Elit, developed by ATOFINA Chemicals Incorporated, is a particular type of scattered Plexiglas (acrylic glass) plate planar waveguide that may be used due to its internal light distribution and diffusion capabilities.

Figure 6:
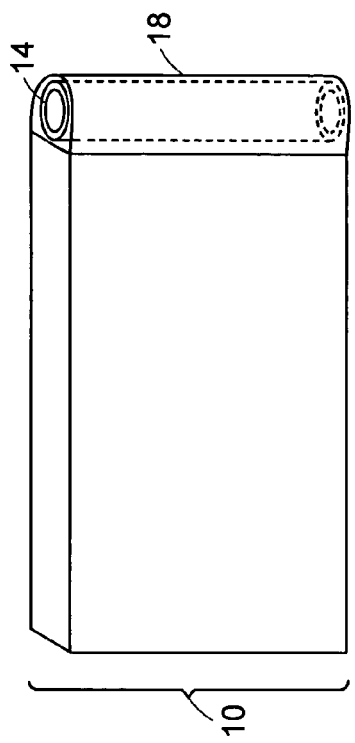
FIG. 6 is a schematic view of an embodiment with removably insertable light source.

In certain embodiments, insulating sleeve 14 may removably hold light source 12 which may be a cold cathode fluorescent lamp as illustrated in FIG. 6. The light source 12 may also utilize a chemical or chemiluminescent reaction to generate light. For example, a glow or chemiluminescent stick may be inserted into insulating sleeve 14 and then easily removed for replacement once the chemical reaction and emitted light are exhausted. The removable light source 12 may also rely on other power sources such as a battery, power cell, and the like. It is also understood that one or more light sources may be employed in insulating sleeve 14.

Figure 7:
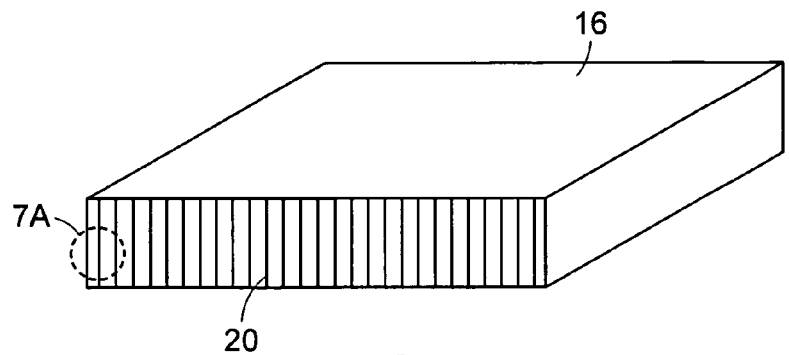
FIGS. 7 and 7A are a schematic and enlarged view respectively of the grooves formed on the planar waveguide edge in contact with the insulating sleeve.
Figure 7A:
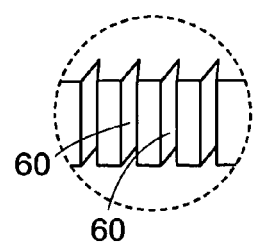

In current edge lit systems, the edge facing the light source is generally polished. In one embodiment, however, ridges or grooves on edge 20, which is in contact with insulating sleeve 14 are employed. Ridges or grooves 60 (FIGS. 7 and 7A) improve the light transfer into planar waveguide 16 by increasing the angle at which light is received by planar waveguide 16 to be about the critical angle. The edge or edge side 20 of the planar waveguide 16 formed with grooves 60 is shown in FIG. 7. While FIGS. 7 and 7A show the grooves 60 oriented perpendicular to the top and bottom of edge 20, the angle of orientation may vary. The grooves 60 may be made using an edging machine. Furthermore, grooves 60 may overlap or criss-cross at varying angles. Other patterns and the like are also suitable for edge 20.

According to the foregoing, the present invention enables a method of providing planar lighting. The invention method includes the steps of a) holding light source 12 in a transparent dielectric sleeve 14 and b) emitting light from light source 12 substantially uniformly through the planar surface 22 of a planar waveguide 16 by contacting at least one edge 20 of the planar waveguide 16 with sleeve 14, such that the planar waveguide 16 receives light from light source 12 through sleeve 14.

In another embodiment, an efficient, reduced loss planar waveguide system includes planar waveguide 16 having planar surface 22 for emitting light, back panel 40 opposite planar surface 22 as shown in FIG. 3, and edge sides 20 and 42 between the planar surface 22 and back panel 40. To reduce light energy losses during delivery of light from light source 12 to planar surface 22, the invention system uses a transparent dielectric sleeve 14 to hold light source 12. The sleeve 14 is positioned adjacent to edge side 20 of planar waveguide 16 to a) effectively place light source 12 in contact with planar waveguide 16, and to b) enable light from light source 12 through sleeve 14 to be incident into the planar waveguide 16. FIG. 3 also shows how reflector 18 further directs and channels light waves 44 into planar waveguide 16.

The sleeve 14, effectively enabling contact between light source 12 and planar waveguide 16, allows planar waveguide 16 to respond to received light by emitting increased amounts of light with respect to a non-contact light source. Also, a means for holding sleeve 14 positioned adjacent to edge side 20 of planar waveguide 16, for example, reflector 18 with connector 24, is employed.

Figure 8:
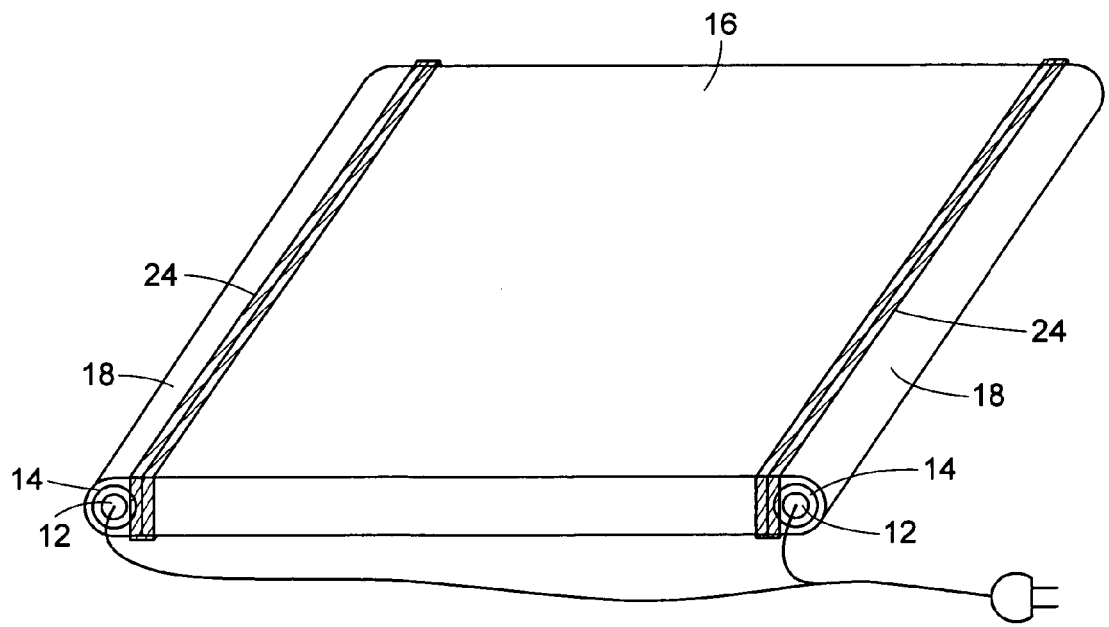
FIG. 8 is a view of an embodiment with multiple light sources.

The foregoing embodiments also apply where multiple sides/edges of planar waveguide 16 are made to be in contact with respective light sources 12 and transparent insulating sleeves 14 as shown in FIG. 8, for example, for large pictures. Light source 12 may also be connected to an external power source using power connector 26 as shown in FIGS. 1 and 2. Furthermore, light source 12 may be connected to a power supply within display structure 30.

As shown in FIG. 4, reflective film 46 may be applied to the edges of planar waveguide 16 to which a respective dielectric or insulating sleeve 14 is not in contact in order to improve the intensity of emitted light from planar waveguide 16. Reflective film 46 may use the same material as reflector 18 or back panel 40 of FIG. 3. Also, as shown in FIG. 4, diffuser film 48 may be applied to planar surface 22 or planar waveguide 16 to improve light distribution when acrylic plate is used for planar waveguide 16.

Figure 9:
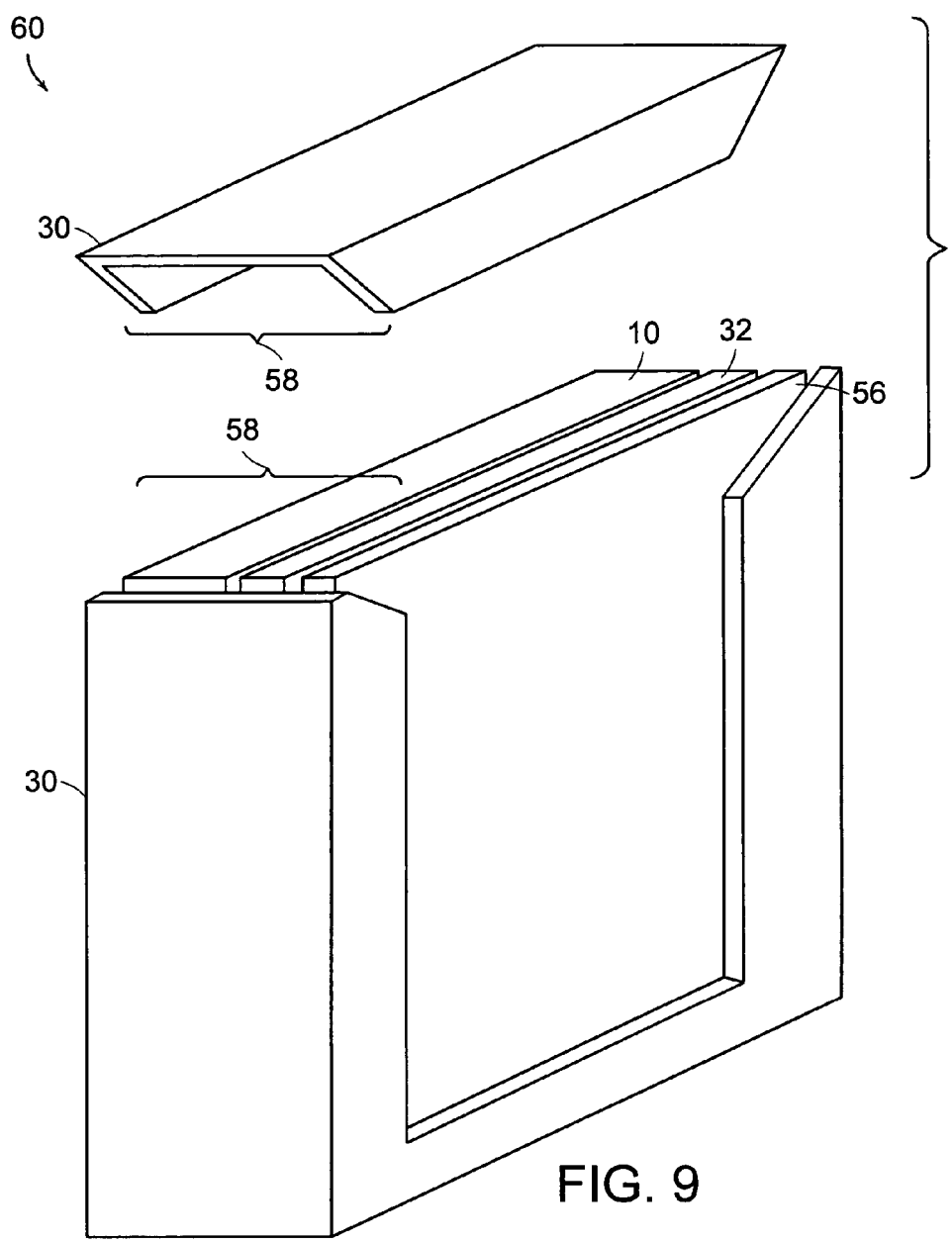
FIG. 9 is a view of an embodiment with a metal display structure.

In a further embodiment as shown in FIG. 9, image display apparatus 60 includes media 32, display structure 30 for displaying the image embedded on or within media 32, and self-contained luminaire 10 that is capable of removable insertion into display structure 30. In this embodiment, self-contained luminaire 10 also functions as a backing board for display structure 30. As a backing board, self-contained luminaire 10 may utilize a means for limiting the amount of light escaping from the back of display structure 30 to about 1% or less of the amount of light within planar waveguide 16 of the luminaire 10.

For example, back panel 40 of luminaire 10 (FIGS. 1A, 1B, 3, and 4) or a combination of back panel 40 with one or more additional back panel layers, which may or may not be connected to display structure 30, may be used to reduce the amount of escaping light from the back of display apparatus 60. Also, the additional back panel layer or layers may have a larger surface area than back panel 40, enabling luminaire 10 to act as a backing board for a display structure 30 with a larger display area than the surface area of luminaire 10. Preferably, display structure 30 includes slot 58 into which self-contained luminaire 10 may be positioned behind media 32. The slot 58 may also enable transparent panel 56 to be positioned in front of image 32. Additional panels may be included in slot 58 such as a cropping panel between media 32 and transparent panel 56 or another backing board behind self-contained luminaire 10.

The recent popularity of digital cameras and digital photography have stimulated the popularity of displaying back lit digital images on computer monitors, cellular telephones, television LCD screens, and the like. Relative to traditional reflective photographs or images, back lit images provide brighter and more clearly perceived matter, especially in low light conditions. In order to mimic the conditions of a back lit LCD display, an image may be embedded on printable media using a standard color inkjet or laserjet printer and then placed in front of a luminaire. Such an inexpensive efficient process may be used to allow a professional or amateur photographer to check or proof photographs using a luminaire as a back light.

Figure 10:
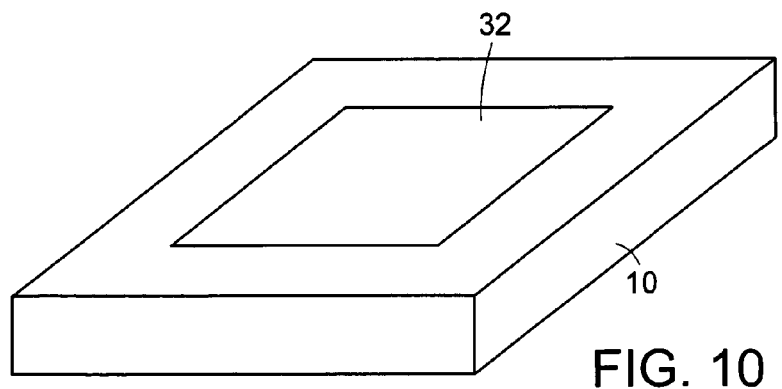
FIG. 10 is a perspective view of horizontally oriented image illumination system using a self-contained luminaire.

In one embodiment, the image illumination system shown in FIG. 10 includes media 32 capable of being embedded with an image, self-contained luminaire 10 acting as a back light for media 32, and a means for positioning media 32 in front of self-contained luminaire 10. The image may be printed or embedded on or within media 32 by any one of an inkjet printer, laserjet printer, photoprocessor, photograph printer, and the like. The media 32 may be a translucent or semi-translucent sheet such a paper, synthetic polypropylene-based paper, inkjet photo paper, film, commercial photographic printer sheets, or the like. The inkjet photo paper may be glossy, semi-gloss, smooth gloss, high gloss, smooth pearl, heavy weight paper, or other similar types of paper. The orientation of luminaire 10 and means for positioning media 32 in front of luminaire 10 may vary depending on the user's needs.

For instance, self-contained luminaire 10 and its light emitting planar surface may be orientated substantially horizontally to allow gravity to hold media 32 in a position in front of (on top of) luminaire 10. In other words, luminaire 10 may be placed horizontally on a desk or table top to allow a photographer to conveniently lay media 32 with an embedded image on top of luminaire 10 for efficient checking or proofing of the image. Alternatively, luminaire 10 may be oriented vertically against a wall or other structure. To position media 32 with an embedded image in front of luminaire 10 when luminaire 10 is oriented vertically, the positioning means may be a clip, clamp, crimp, slot, static charge, adhesive, frame structure, or the like that is capable of holding media 32 in position in front of and against the planar surface of luminaire 10. The above techniques may also apply to any other orientation of luminaire 10.

It should be obvious that all components may be manufactured and assembled using well-known components and techniques. Also, luminaire 10 may be constructed of various shapes, sizes, and surface areas depending on the shape and size of media 32 and display structure 30. Furthermore, display structure 30 may be made of various materials such as metal, wood, glass, molded plastic, or the like. For example, FIG. 9 illustrates a metallic version of display structure 30 wherein luminaire 10 is inserted into display structure 30 by sliding luminaire 10 into slot 58 that holds media 32 with an embedded image. When display structure 30 is made of another material such as wood, luminaire 10 may be inserted directly into the back of the structure and held in place using clips or other holding mechanisms attached to display structure 30.

While this invention has been particularly shown and described with references to preferred embodiments thereof, it will be understood by those skilled in the art that various changes in form and details may be made therein without departing from the scope of the invention encompassed by the appended claims.

For example, in the foregoing description of the invention and various embodiments thereof, the term "image" is intended to include various media, media capable of being embedded with an image, or media suitable for carrying an image.

What is claimed is:

1. A flat panel luminaire apparatus comprising:
a light source;
a thermal insulating sleeve surrounding said light source, the sleeve being transparent and allowing light from the light source to pass from at least a plurality of an inner surface of the sleeve through an outer surface of the sleeve;
a planar waveguide having an edge in contact with the outer surface of said insulating sleeve and receiving light therefrom, the planar waveguide emitting the received light through a planar surface; and
a reflector surrounding the outside of a substantial portion of said insulating sleeve and directing light into said edge of the planar waveguide, said reflector being coupled to the planar waveguide.

2. The apparatus according to claim 1 wherein the planar waveguide and insulating sleeve with the light source form a self-contained unit that is capable of removable insertion into a display structure.

3. The apparatus according to claim 2 wherein the display structure is a picture frame.

4. The apparatus according to claim 1 further comprising an adhesive connector for coupling said reflector to the planar waveguide.

5. The apparatus according to claim 1 further comprising a friction connector for coupling said reflector to the planar waveguide.

6. The apparatus according to claim 4 wherein the adhesive connector is any one or combination of metalized tape, vinyl tape, and polyester tape.

7. The apparatus according to claim 6 wherein the metalized tape is segmented into two or more sections along an edge of the planar waveguide to prevent electrical current flow.

8. The apparatus according to claim 4 wherein the reflector is a thin polymer film and the adhesive connector is adhesive tape, the thin polymer film and adhesive tape holding the insulating sleeve in contact with the edge of the planar waveguide for delivery of light thereto.

9. The apparatus according to claim 1 further comprising a back panel for the planar waveguide that reflects light toward the light emitting planar surface of said planar waveguide and limits pass-through light emissions.

10. The apparatus according to claim 9 wherein the back panel is any one or a combination of a polystyrene sheet, a foamed Poly-Vinyl Chloride (PVC) sheet, a Polyethylene Terephthalate (PET) sheet, and a thin polymer film specular surface reflector sheet.

11. The apparatus according to claim 1 wherein the insulating sleeve is a clear fluoropolymer tube.

12. The apparatus according to claim 1 wherein the insulating sleeve has an index of refraction equal to or less than the index of refraction of the planar waveguide such that increased amounts of light from the insulating sleeve are received by the planar waveguide.

13. The apparatus according to claim 1 wherein the planar waveguide is any one of an acrylic plate and scattered acrylic plate.

14. The apparatus according to claim 13 wherein the planar waveguide has a matrix of ink dots whose diameters, densities of ink, or both increase as a function of distance from the edge of the planar waveguide such that the matrix enables an even distribution of light to be emitted from the planar surface of the planar waveguide.

15. The apparatus according to claim 13 wherein planar waveguide uses varying amounts of internal discrete light scattering elements to disperse the received light to evenly emit light from the planar surface of the planar waveguide.

16. The apparatus according to claim 1 wherein the insulating sleeve removably holds the light source.

17. The apparatus according to claim 1 wherein the light source is a cold cathode fluorescent lamp.

18. The apparatus according to claim 1 wherein the light source is derived from a chemiluminescent reaction.

19. The apparatus according to claim 1 wherein the edge of the planar waveguide is formed of grooves that cause the angle of at least some of the received light to be about the critical angle.

20. The apparatus according to claim 1 wherein the reflector is any one of a metal sheet, white polymer sheet, a white Polyethylene Terephthalate (PET) sheet, a polytetrafluoroethylene (PTFE) sheet, and a thin polymer film specular surface reflector sheet.

21. A method of providing planar lighting comprising the steps of:
holding a light source in a transparent thermally insulating dielectric sleeve;
emitting light from said light source substantially uniformly through a planar surface of a planar waveguide by contacting at least one edge of the planar waveguide with an outer surface of said sleeve such that the planar waveguide receives light from the light source passed from at least a plurality of an inner surface of the sleeve through the outer surface of the sleeve to the at least one edge of the planar waveguide; and
providing a reflector that directs light from outside of the sleeve into the at least one edge of the planar waveguide, said reflector being coupled to the planar waveguide.

22. The method according to claim 21 wherein the planar waveguide and sleeve together are a self-contained unit.

23. The method according to claim 22 further comprising the step of positioning said self-contained unit behind an image in a display structure to back light said image.

24. The method according to claim 23 wherein said display structure is a picture frame.

25. The method according to claim 21 further comprising using an adhesive connector for coupling said reflector to the planar waveguide.

26. The method according to claim 25 wherein the adhesive connector is any one of or a combination of metalized tape, vinyl tape and polyester tape.

27. The method according to claim 26 further comprising the step of segmenting the tape into two or more sections along the one edge of the planar waveguide to prevent electrical current flow.

28. The method according to claim 25 wherein the step of providing a reflector includes employing a thin polymer film, and the step of using an adhesive connector includes using adhesive tape; and
further comprises the step of using the thin polymer film and the adhesive tape to hold the sleeve in contact with the one edge of the planar waveguide for the delivery of light thereto.

29. The method according to claim 21 further comprising using a friction connector for coupling said reflector to the planar waveguide.

30. The method according to claim 21 further comprising providing a back panel for the planar waveguide that reflects light toward the light emitting planar surface of said planar waveguide and limits pass-through light emissions.

31. The method according to claim 30 wherein the back panel is any one or a combination of a polystyrene sheet, a foamed Poly-Vinyl Chloride (PVC) sheet, and a Polyethylene Terephthalate (PET) sheet, and a thin polymer film specular surface reflector sheet.

32. The method according to claim 21 wherein the sleeve is a clear fluoropolymer tube.

33. The method according to claim 21 wherein the sleeve has an index of refraction equal to or less than the index of refraction of the planar waveguide such that increased amounts of light from the sleeve are received by the planar waveguide.

34. The method according to claim 21 wherein the planar waveguide is any one of an acrylic plate and scattered acrylic plate.

35. The method according to claim 34 wherein the planar waveguide has a matrix of ink dots whose diameters, densities of ink, or both increase as a function of distance from the edge of the planar waveguide such that the matrix enables an even distribution of light to be emitted from the planar surface of the planar waveguide.

36. The method according to claim 34 wherein the planar waveguide uses varying amounts of internal discrete light scattering elements to disperse the received light to evenly emit light from the planar surface of the planar waveguide.

37. The method according to claim 21 wherein the step of holding includes the sleeve removably holding the light source.

38. The method according to claim 21 wherein the light source is a cold cathode fluorescent lamp.

39. The method according to claim 21 wherein the light source is derived from a chemiluminescent reaction.

40. The method according to claim 21 further comprising the step of forming the one edge of the planar waveguide with grooves that cause the angle of the received light to be about the critical angle.

41. The method according to claim 21 wherein the reflector is any one of a metal sheet, a white polymer sheet, a white Polyethylene Terephthalate (PET) sheet, a polytetrafluoroethylene (PTFE) sheet, and a thin polymer film specular surface reflector sheet.

42. A planar waveguide system comprising:
   a planar waveguide having a planar surface for emitting light, a back panel opposite the planar surface, and edge sides between the planar surface and the back panel;
   a transparent dielectric thermal insulating sleeve for holding a light source, the transparent dielectric sleeve being positioned adjacent to an edge side of the planar waveguide such that light from the light source, through at least a plurality of an outer surface along a side of the transparent dielectric sleeve, is incident into and received by the planar waveguide;
   the sleeve effectively enabling contact between the outer surface of the transparent dielectric sleeve and the planar waveguide, and the planar waveguide responding to received light by emitting increased amounts of light with respect to a non-contact light source;
   means for holding the sleeve adjacent to the edge side of the planar waveguide; and
   a reflector surrounding the outside of a substantial portion of said insulating sleeve and directing light into said edge of the planar waveguide, said reflector being coupled to the planar waveguide.

43. The system according to claim 42 wherein the sleeve has an index of refraction similar to the index of refraction of the planar waveguide such that increased amounts of light are received by the planar waveguide.

44. The system according to claim 42 wherein the sleeve is a clear Fluoropolymer tube.

45. The system according to claim 42 wherein the light source is one of a cold cathode fluorescent lamp or a chemiluminescent light stick.

* * * * *